United States Patent [19]
Rosencrantz

[11] 3,743,796
[45] July 3, 1973

[54] DEEP SEA BRUSHLESS COMMUTATOR
[75] Inventor: Donald M. Rosencrantz, Honolulu, Hawaii
[73] Assignee: The United States of America as represented by the Secretary of the Navy, Washington, D.C.
[22] Filed: Nov. 29, 1971
[21] Appl. No.: 202,817

[52] U.S. Cl. ................. 191/12.2 A, 137/355.16
[51] Int. Cl. ............................................ H02g 11/02
[58] Field of Search ..................... 242/54 R, 86; 191/12.2 R, 12.2 A, 12.4; 137/355.16, 355.17, 355.20, 355.25

[56] References Cited
UNITED STATES PATENTS
3,128,857  4/1964  Walton ..................... 191/12.2 R
2,629,027  2/1953  Piatt ......................... 191/12.2 R
1,380,549  6/1921  Flood ......................... 137/355.25
3,145,725  8/1964  Knights ...................... 137/355.17

Primary Examiner—Gerald M. Forlenza
Assistant Examiner—D. W. Keen
Attorney—Richard S. Sciascia, Ervin F. Johnston and William T. Skeer et al.

[57]  ABSTRACT

A winch for electrical cable has a tensioned cable input roller pair which permits electrical power to be applied to the cable while the winch is operated. The roller pair is driven by the winch rotation in such a fashion as to prevent axial rotation or twist of the electrical conductor.

6 Claims, 3 Drawing Figures

Patented July 3, 1973 3,743,796

INVENTOR.
DONALD M. ROSENCRANTZ
BY  WILLIAM T. SKEER
AGENT
ERVIN F. JOHNSTON
ATTORNEY

DEEP SEA BRUSHLESS COMMUTATOR

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of oceanographic instrumentation. More particularly, but not by way of limitation thereto, this invention pertains to the streaming and recovery of oceanographic instrument packages with electrical circuit connections to the supporting surface ship. By way of further clarification, this invention pertains to a novel method and apparatus to permit an electrical conductor to be connected in circuit as it is being streamed or recovered from an oceanographic surface vessel which may be underway.

DESCRIPTION OF THE PRIOR ART

In many oceanographic and naval operations, a device is streamed from a surface vessel which requires electrical circuit connections therebetween. Examples of such devices are well known in the field of seismic exploration, oceanographic measurement, mine sweeping, and piscatorial industries. In the past, such operations have involved streaming the desired length of cable aft of the surface vessel and then making electrical connections to the cable at spaced points therealong. Such operations are time consuming, difficult to perform in heavy seas, and result in electrical connections which are non-uniform in quality. In operations where different cable lengths are frequently required, or in operations where relative movement between the towed device and the surface ship are required, electrical connections to the streamed cable have, in the past, been made by means of commutator or slip ring devices. Such devices suffer from disadvantages or mechanical wear and, more importantly, the insertion of electrical noises into the system. The latter difficulties are especially bothersome where the electrical circuit is a low level signal, as might be experienced, for example, with oceanographic instruments such as magnetometers or certain acoustic hydrophones.

One prior art system to overcome the aforesaid disadvantages has employed the technique of wrapping a length of the cable to be streamed from the surface ship about an extension of the axle of the reel upon which the cable is wound. In such arrangements, the portion of the cable wrapped on the axle extension is wrapped in the same direction with that disposed on the reel. In this fashion, as the cable is unspooled from the reel the cable on the axle is unspooled and allowed to fall to the deck. In some instances, baskets or retainers have been positioned to collect the cable as it comes from the axle. However, such cable still presents handling problems which must be overcome. That is, cable lying loosely coiled on the deck presents a safety hazard to personnel working in the vicinity of the cable and causes excessive wear to the cable resulting in electrical failure and undesirable electrical noise being introduced into the circuit. Likewise, in recovering the cable, that portion of the cable that is wound on the axle must have an independent level wind device or other apparatus to ensure uniform coiling thereon.

With the aforementioned disadvantages of the prior art arrangements in mind, there has been a long felt, unmet need in the naval engineering and oceanographic instrumentation arts for an electrical system which will permit in-circuit streaming and recovery of electrical cables without the introduction of electrical noise or mechanical wear into the electrical circuits, which will be self-contained and free of undue storage or mechanical spooling problems, and which may be employed with a minimum manning requirement in heavy weather.

SUMMARY OF THE INVENTION

The method and device of the present invention overcome the aforementioned disadvantages of the prior art by providing a reeling and spooling system for electricl oceanographic cables which may be streamed and recovered while the towing vessel is underway and which has no brushes or electrical commutators associated therewith. Further, this invention employs two spools which store interconnecting electrical conducting cable and are driven by the reel paying out or recovering the streamed oceanographic cable in such a fashion that the interconnected cable is transferred from one to the other without causing twisting movements of the cable or interconnecting wires.

STATEMENT OF THE OBJECTS OF THE INVENTION

Accordingly, it is an object of this invention to provide an improved oceanographic electrical winch.

A further object of this invention is to provide a winch which may stream or recover electrical cable while having electrical connections made thereto.

Another object of this invention is the provision of an oceanographic electrical cable storage and deployment system which is free from electrical noises generated by brush and commutator type connections.

Another object of this invention is the provision of a winch which pays out and recovers electrical cable which is connected in electrical circuit with shipboard electronic devices during such winding and reeling operation.

Another object of the present invention is the provision of an oceanographic winch which occupies a minimum of deck space.

A further object of this invention is the provision of an oceanographic winch which may pay out or recover a length of electrical cable without the use of auxiliary, external cable or wire handling devices.

These and other objects of the invention will become more readily apparent from the ensuing specification when taken with the drawings.

DESCRIPTION OF THE PREFERRED EMBODIMENT

Figure 1:
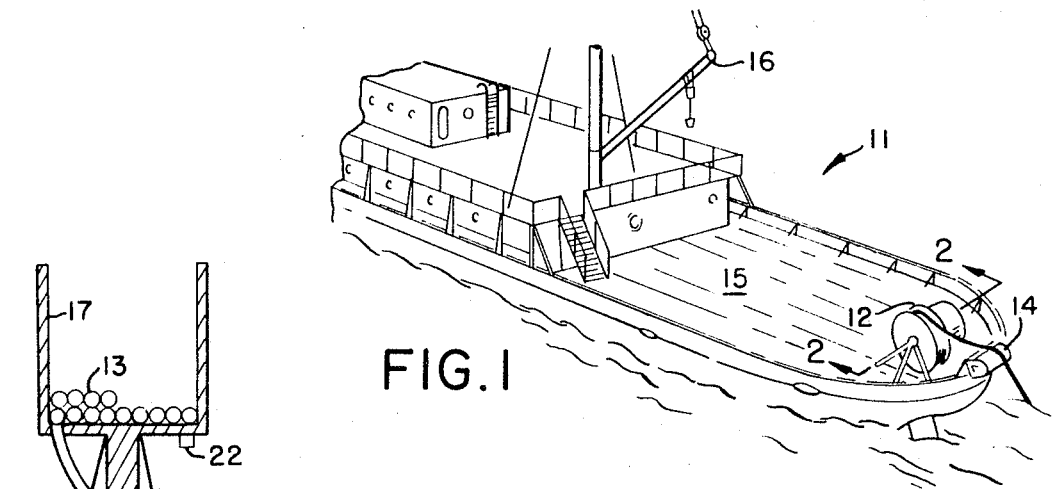
FIG. 1 is a perspective view of an oceanographic vessel using the device of the invention.

FIG. 1 shows an oceanographic vessel 11 having oceanographic winch 12 according to the invention mounted on the fantail thereof. Oceanographic cable 13 paid out from winch 12 passes over suitable tackle 14 to stream oceanographic cable 13 over the taffrail of vessel 11. For purposes of simplicity, the particular oceanographic instrument streamed by oceanographic cable 13 is not illustrated. However, it should be understood that the device of the invention may be used with any number of current state of the art oceanographic instrumentation systems.

As shown, a portion of the deck 15 forward of oceanographic winch 12 is left clear for the storage and work of the oceanographic system streamed by cable 13. A suitable hoisting mechanism 16, conventional in the naval engineering arts, is provided for streaming and recovering of the oceanographic instrument connected to cable 13. However, as will be obvious to those skilled in the art, the details of vessel 11 may be varied considerably from application to application and that shown should be regarded as for purposes of illustration only.

Figure 2:
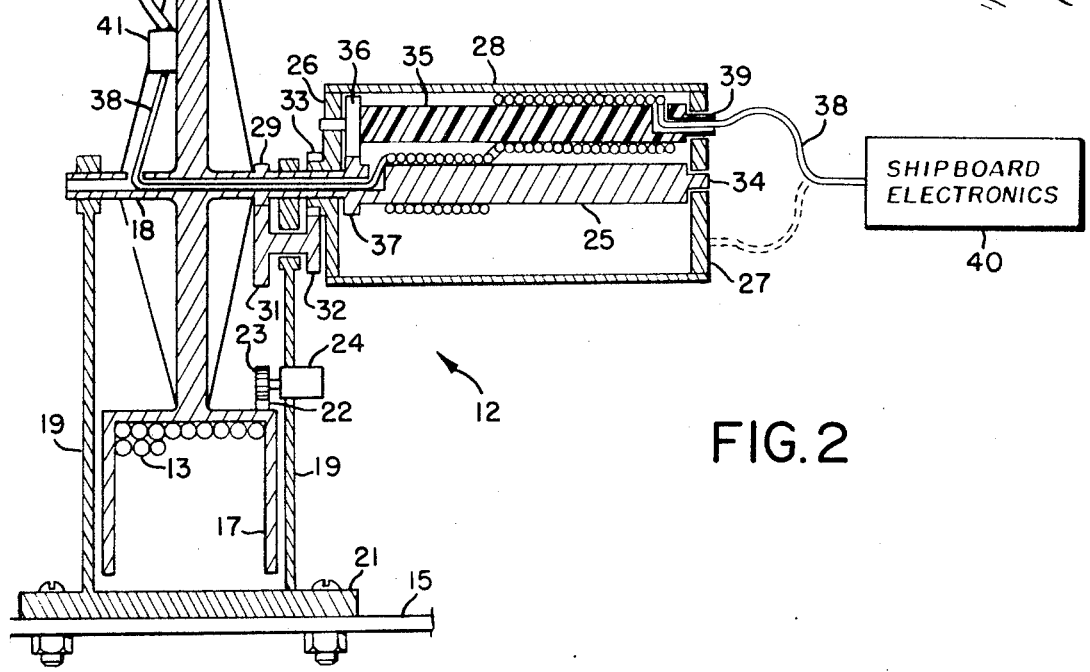
FIG. 2 is a sectional view of the oceanographic winch of the invention taken along lines 2—2 of FIG. 1.

Referring to FIG. 2, the oceanographic winch 12 according to the invention is illustrated in transverse section taken along lines 2—2 of FIG. 1. As may be seen, cable 13 is wound on a suitable drum 17. A hollow central axle 18 of drum 17 is rotatably supported in a pair of spaced apart upright supporting members 19. Supporting members 19 are attached to a suitable base structure 21 which, in turn, is attached to deck 15 by conventional means. Drum 17 may be made of a suitable material capable of withstanding the arduous working conditions of shipboard use and the corrosive action commonly associated with ocean spray for which deck machinery must be designed.

Drum 17 is rotated by means of a bull or ring gear 22 mounted on an inner surface thereof and extending circumferentially thereabout. A drive gear 23 engages bull gear 22 and, in turn, is driven by suitable motor 24. Motor 24, gear 23, and ring gear 22, therefore, are solely to comprise drum drive means. Motor 24, which is schematically illustrated in FIG. 2, may be of any suitable type. In practical applications, a hydraulic rotary motor has proven very satisfactory in this application. Likewise, other means may be used to transmit the driving forces from motor 24 rather than the gear arrangement shown. For example, sprocket and roller chains, friction rollers, or independent driving motors may be incorporated if conditions warrant.

Hollow axle 18 extends through upright supports 19 and extends to one side thereof. On its outermost end, axle 18 has a suitable spool means 25 supported thereon. Of course, spool means 25 rotates with hollow axle 18 at a speed controlled by the drum drive arrangement or drum 17.

A rotatable cage means comprising an inner end 26 and an outer end 27 and a connecting cover means 28 is also rotatably mounted on hollow axle 18. The rotatable cage means is positioned so as to enclose spool means 25. The rotatable cage means is driven by the action of drum 17 through a suitable transmission means, such as the gear arrangement to be described.

An axle gear 29 is attached to axle 18 and rotates therewith at the same speed as drum 17. If desired gear 29 may, of course, be made integral with axle 18. A speed reduction gear 31 is positioned in such a manner as to be in mesh with axle gear 29 and is driven thereby. In the illustrated arrangement, the dimensions of gear 31 are chosen such that it has an angular speed of one-half of that of drum 17. A suitable drive gear 32 is attached to speed reduction gear 31 and is journaled to rotate therewith in upright support 19. Drive gear 32 engages an identically dimensioned cage gear 33 which is fastened to, or made integrally with, inner end 26 of rotatable cage means. Thus the cage rotates at one-half the angular speed and in the same direction as drum 17. Cover 28, of course, carries outer end 27 of rotatable cage means at the same speed as the inner end. Outer end 27 rotates about a terminating axle portion 34 of spool means 25. A take-up spindle 35 is supported between end portions 26 and 27 of the rotatable cage means and is journaled to rotate therein. A gear means 36 at the inner end of take-up spool 35 is in mesh with an identically dimensioned gear 37 which is at the inner end of sppol means 25.

Those familiar with the mechanical arts will readily see that although take-up spool 35 orbits about spool means 25 the net rotation of spool 35 relative to an exterior point is zero. That is, its rotational speed is of such a magnitude and direction as to counteract the rotary motion caused by the orbital action. This net rotation of zero plus the relative rotation of spools 35 and 25 permit the transfer of a connecting wire 38 from one spool to the other without axlely twisting or rotating connecting wire 38. This permits non-fouling connection to circuitry 40 carried on vessel 11. Connecting wire 38 extends through a hollow end 39 of spool 36 and is wrapped thereabout and is then wrapped about spool means 25 and extended through hollow axle 18 to a suitable junction box 41.

It will be recognized by those skilled in the art that the relative rotational speeds of spindle 35 and spool 25 are dependent on their diameters. That is, if of different sizes the relative velocities as well as axial positioning would have to be adjusted accordingly.

For purposes of illustration, the two are of the same size and, in practice, this arrangement is the most practical and provides good space utilization of the interior of the cage means.

Oceanographic cable 13, which is wound about spool 17, also is extended to junction box 41 where connection is made with connecting wire 38. As oceanographic cable 13 is spooled onto spool 17 connecting wire 38 is transferred from take-up spool 35 to the axial spool means 25. Because the diameters of spools 25 and 35 are small in comparison to the diameter of drum 17, a relatively short length of connecting wire 38 is used to compensate for much longer lengths of oceanographic cable 13.

Figure 3:
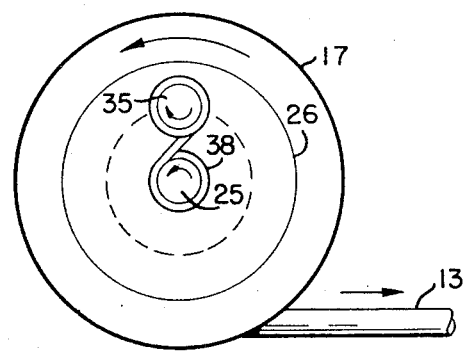
FIG. 3 is a diagramatic view of the winding mechanism used in the invention.

Referring to FIG. 3, the dynamics of this winding situation may be more readily visualized. As cable 13 is paid out from spool 17, the cage means including inner end 26 rotates at half speed therewith; however, the axial spool means 25 turns at the same angular velocity as spool 17. Take-up spool 35 which is carred with the cage means, as here represented by end plate 26, about spool 25 is also driven thereby by means of the aforedescribed gears 36 and 37, not shown in FIG. 3, at the same speed. As a result, it will be seen that the connecting wire 38 is transferred from spool 25 to spool 35 as the cable is paid out or from 35 to 25 as oceanographic cable 13 is rewound. Thus, it may be seen that the outer end of connecting wire 38 flexes as the rotatable cage means turns but does not experience an axial twist. The length of spools 25 and 35, and hence the length of the rotating cage means is determined by the length of oceanographic cable 13 which is desired to be paid out of spool 17 and the diameter of connecting wire 38.

However, the oceanographic cable which frequently includes strain relief members and buoyant components may be quite large in diameter in comparison to connecting cable 38 which need contain only the electrical conducting portions covered by a suitable thin sheet of insulation material.

The foregoing description taken together with the appended claims constitutes a disclosure such as to enable a person skilled in the naval engineering arts having the benefit of the teachings therein to make and use this invention. Further, the structure herein described meets the objects of the invention, and generally constitutes a meritorious advance in the art unobvious to such a skilled worker not having the benefit of the teachings contained herein.

Obviously, many modifications and variations of the present invention are possible in the light of the above teachings, and, it is therefore understood that within the scope of the disclosed inventive concept, the invention may be practiced otherwise than specifically described.

What is claimed is:

1. An oceanographic winch comprising:
   drum means for dispensing and recovering predetermined length of cable wound thereon;
   drum drive means operatively connected to said drum means for reversible rotation thereof;
   spool means effectively connected to said drum means and extending outwardly therefrom for coaxial rotation therewith for winding an electrical conductor thereon;
   cage means rotatably connected to, and extending about, said spool means and operatively driven for rotation thereabout;
   take-up spindle means connected to said cage means so as to be journaled therein parallel to said spool means and carried in a rotational path about said spool means for winding cooperation therewith;
   spindle drive means connected to said take-up spindle means for revolving said spindle at a predetermined rate about a central axis thereof; and
   electrical conductor means connected in electrical circuit relationship with the cable stored on said drum means and wound about said spool means and said take-up spindle means,
   whereby said electrical conductor means is transferred between said spool and spindle means without longitudinal twisting as said drum means dispenses and recovers the cable wound thereon.

2. An oceanographic winch according to claim 1 in which said drum drive means includes:
   ring gear means effectively attached to said drum means about the central inner surface thereof and extending circumferentially thereabout for providing engaging connection thereto;
   drive gear means positioned in meshed cooperation with said ring gear means for driving cooperation therewith; and
   rotary power means connected to said drive gear means for powered rotation thereof.

3. An oceanographic winch according to claim 1 in which said spindle drive means comprises a transmission means effectively connected between said take-up spindle means and said spool means.

4. An oceanographic winch comprising:
   drum means for dispensing and recovering predetermined length of cable wound thereon;
   drum drive means operatively connected to said drum means for reversible rotation thereof;
   spool means effectively connected to said drum means for rotation therewith for winding an electrical conductor thereon;
   cage means rotatably connected to, and extending about, said spool means and operatively driven for rotation thereabout;
   said cage means including;
   inner end structure journaled for rotation about the axis of said drum and said spool means and positioned therebetween,
   cage drive means effectively joined to said inner end structure for providing connection thereto,
   outer end structure journaled for rotation about an axial extension on the outer end of said spool means, and
   cover means joined to and extending between said inner and outer end structures forming a rigid structure therewith,
   take-up spindle means connected to said cage means so as to be carried thereby in a rotational path about said spool means for winding cooperation therewith;
   spindle drive means connected to said take-up spindle means for revolving said spindle at a predetermined rate about a central axis thereof; and
   electrical conductor means connected in electrical circuit relationship with the cable stored on said drum means and wound about said spool means and said spindle means,
   whereby said electrical conductor means is transferred between said spool and spindle means without longitudinal twisting as said drum means dispenses and recovers the cable wound thereon.

5. An oceanographic winch according to claim 4 further comprising:
   drum driven means effectively joined to the aforesaid drum means for providing driven power output therefrom; and
   transmission means operatively connected between said drum driven means and said cage drive means for transmitting driving force therebetween and effecting a predetermined rotation of said cage means relative to the aforesaid spool and drum means.

6. An oceanographic winch for paying out and recovering an oceanographic cable from a marine vessel while permitting continuous electric circuit connection therebetween comprising in combination:
   base means attached to said marine vessel for transmitting forces developed by said winch thereto;
   support means attached to said base means and extending upwardly therefrom for providing positioning support thereabove;
   drum means rotatably mounted on said support means for storage and reeling movement of an oceanographic cable wound thereon;
   drum drive means effectively attached to said drum means for driving connection thereto;
   rotary power source means attached to said support means and connected to said ring gear means for providing powered, reversible rotation of said drum means;
   a hollow axle passing through and connected to said drum means and extending to one side thereof beyond said support means;

spool means attached to said hollow axle for rotation therewith and having a transverse bore communicating with the hollow center of said axle;

power take off means operatively attached to said axle for providing a driven power output therefrom;

transmission means operatively attached to said power take off means and driven thereby for providing driving connections therefrom having a predetermined speed reduction;

cage means mounted on said axle and positioned to enclose said spool means and operatively connected to said transmission means as to be rotated thereby for providing rotational support for;

take up spindle means rotatably mounted in said cage means to be carried thereby in orbiting relation to said spool means;

coupling means connected between said spool means and said take up spindle means for rotating said take up spindle at a predetermined rate in relation to the angular velcities of said cage means and said spool means; and conductor means electrically connected in circuit between an electrical device on said marine vessel and the cable wound on said drum means, and physically connected therebetween by being wound about said take up spindle and said spool to extend through the transverse bore therein, and be positioned within the hollow center of said axle, whereby paying out or reeling in said cable from said drum means results in a transfer of conductor means from said take up spool means to said spool means, or vice versa, without longitudinal twisting said electrical conductor or causing unwinding thereof.

* * * * *